M. B. FISCHER.
EMERGENCY BRAKE.
APPLICATION FILED MAR. 12, 1913.
1,123,718.
Patented Jan. 5, 1915.
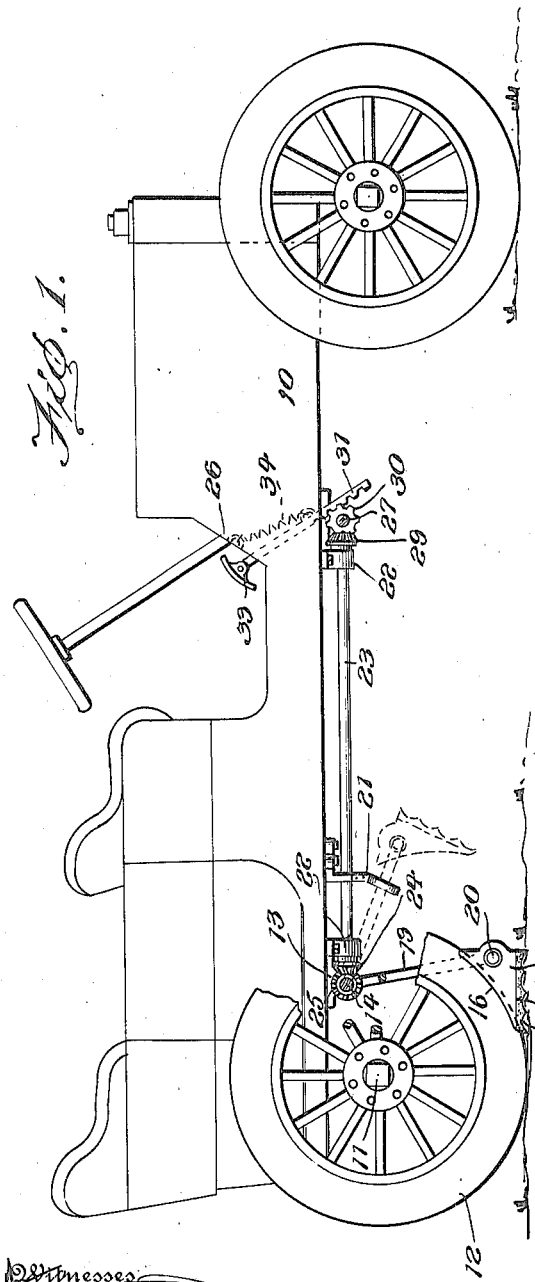
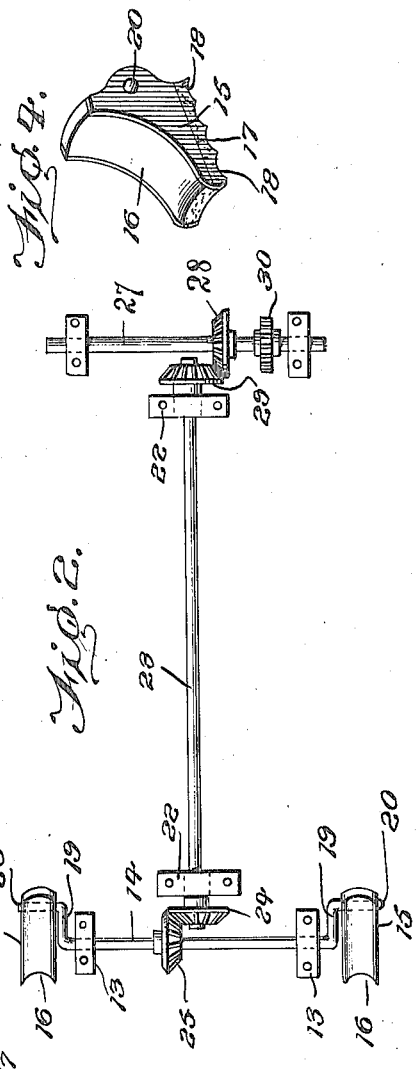

UNITED STATES PATENT OFFICE.

MORITZ B. FISCHER, OF CHICAGO, ILLINOIS.

EMERGENCY-BRAKE.

1,123,718.  Specification of Letters Patent.  Patented Jan. 5, 1915.

Application filed March 12, 1913. Serial No. 753,830.

*To all whom it may concern:*

Be it known that I, MORITZ B. FISCHER, a citizen of the United States, residing at Chicago, in the county of Cook and State of Illinois, have invented certain new and useful Improvements in Emergency-Brakes, of which the following is a specification.

This invention relates to emergency brakes for vehicles, more particularly to brakes employed on automobiles, auto-trucks, and similar vehicles to instantly check "skidding" or lateral movement when running over slippery pavements or when rounding curves at high speed, and has for one of its objects to improve the construction and increase the efficiency and utility of devices of this character.

Another object of the invention is to provide a simply constructed device which may be readily applied without material structural change to automobiles, auto-trucks, and like vehicles and which is maintained yieldably in inoperative position when not in use, and adapted to be instantly drawn into operative position when required.

Another object of the invention is to provide a simply constructed mechanism whereby the improved brake is actuated from the seat of the driver.

With these and other objects in view the invention consists in certain novel features of construction as hereinafter shown and described and then specifically pointed out in the claims, and in the drawings illustrative of the preferred embodiment of the invention.

Figure 1 is a side elevation of a conventional automobile with the improvement applied, and partly in section. Fig. 2 is a plan view of portions of the parts shown in Fig. 1. Fig. 3 is a detached perspective view of the yieldable holding device for the radius rods. Fig. 4 is an enlarged detached perspective view of one of the brake shoes.

Corresponding and like parts are referred to in the following description and indicated in all the views of the drawings by the same reference characters.

The improved device may be applied to any of the various constructions of automobiles, auto-trucks, and the like, and for the purpose of illustration is shown applied to a conventional automobile in which a supporting body or frame is represented at 10, the rear axle at 11 and one of the rear wheels at 12. Depending from the body 10 adjacent to the rear axle are hangers 13 in which a transverse shaft 14 is mounted for rotation. The brake shoes are represented as a whole at 15, one for each of the rear wheels, and each having a concaved face 16 curved to conform to the curvature of the wheel and with a flat bearing face 17, the two faces 16—17 extending obliquely to each other. The concaved face 16 is preferably lined with rubber, leather, or like material, while the lower face 17 is preferably of metal and detachably engaged with the body 15 of the shoe and provided with a roughened or serrated surface indicated at 18 to increase the "grip" of the shoe upon the ground.

Extending from the shaft 14 are radius members 19 connected respectively at 20 in one of the body portions 15 of each shoe, the connection 20 being preferably a pivot so that the shoes are free to swing relatively to the radius members. The brackets or hangers 13 are located slightly in advance of the axle 11, and when thus arranged it will be obvious that when the radius members are depressed to their lower position, the rear reduced portions of the shoes 15 will pass between the wheels 12 and the ground, and thus firmly lock the wheels from rotation, the leather or rubber lining of the shoes coacting with the serrated portions 18 of the shoes to firmly grip the wheel to hold it from rotation, while at the same time presenting a relatively large surface upon the ground and transforming the vehicle into a sled with transversely roughened "runners" to effectually check any lateral motion of the vehicle.

Extending from the framework of the body 10 is a spring actuated clasp or catch 21 which engages the radius bars when the latter are elevated and hold the shoes in inoperative position, but which will yield and permit the radius bars to be depressed when a sufficient pressure is applied.

Depending from the frame 10 are hangers 22 supporting a longitudinally directed shaft 23 having a beveled pinion 24 at its rear end engaging with a similar beveled pinion 25 on the shaft 14. Mounted for rotation upon the body 10 beneath the footboard portion 26 of the body is a counter shaft 27 having a beveled pinion 28 engaging with a similar beveled pinion 29 on the longitudinal shaft 23. The shaft 27 is likewise provided with a pinion 30 engaging with a rack 31. The rack is slidably supported by keepers and extends through the footrest portion 26 of the body and terminates in a foot receiving step 33 which is preferably pivoted to the rack, as shown. A spring 34 is connected to the rack 31 and operates to maintain the same yieldably in withdrawn position. By this arrangement it will be obvious that when the rack 31 is drawn to its outer position by the spring 34 the shafts 23 and 14 will be rotated to hold the radius bars 19 and their shoes 15 yieldably in elevated position and withdrawn from engagement with the traction wheels.

When the brake is to be applied the chauffeur compresses the rack 31 by the application of his foot to the step 33 and thus applies rotary motion to the shafts 27, 23 and 14 and moves the shoes 15 into position between the ground and the wheels 12 and thus instantly stops the rotation of the wheels and the forward and lateral movement of the vehicle, and when the pressure is removed from the step 33 the spring 34 automatically moves the rack 31 into its upper position and thus reverses the movement of the radius bars 19 and restores the shoes to their inoperative or elevated position, and at the same time couples the radius bars with the holding catches 21.

The improved device is simple in construction, and can be inexpensively manufactured and applied to automobiles and like devices without changing the structure.

Having thus described the invention, what is claimed is:

1. The combination with a vehicle including a supporting body and traction wheels, of a pair of spaced transverse shafts, a longitudinal shaft, pinions operatively connecting the terminals of the longitudinal shaft to the transverse shafts, radius members keyed on one of the transverse shafts, brake shoes carried by the free terminals of the radius members, a pinion keyed on the other transverse shaft, a rack bar slidable through the vehicle body and having a foot pedal, said rack bar being engageable with the pinion, and a spring adapted to normally hold the rack bar in elevated position.

2. The combination with a vehicle including a supporting body and traction wheels, of a brake including a forward transverse shaft, a rearward transverse shaft, a longitudinal shaft operatively connecting the transverse shafts, radius members fixed to the rear transverse shaft and adapted to be swung upon the rotation thereof, brake shoes carried by the free terminals of the radius members, a pinion keyed on the forward transverse shaft, a rack bar engageable with the pinion and having a foot pedal, said rack bar being mounted for sliding movement through the body of the vehicle, and yieldable means normally holding the rack bar in elevated position whereby the brake shoes are normally held in an operative position, the downward movement of the rack bar through the vehicle body being adapted to cause the downward swinging movement of the radius members with the resultant movement of the brake shoes in their operative position.

3. The combination with a vehicle including a supporting body and traction wheels, of a shaft mounted for rotation upon said body and having radius members extending from its ends, brake shoes carried by the free terminals of the radius members, a counter shaft mounted for rotation upon said body, a pinion carried by said counter shaft, a rack bar engaging said pinion and provided with a foot pedal, and means for transmitting the motion of said rack bar to said radius member carrying shaft.

In testimony whereof I affix my signature in presence of two witnesses.

MORITZ B. FISCHER. [L. S.]

Witnesses:
B. H. FISCHER,
SAM BERNSTEIN.